(12) United States Patent
Deland

(10) Patent No.: US 10,316,982 B2
(45) Date of Patent: Jun. 11, 2019

(54) CURVED SHUNT FOR SOLENOID CURVE SHAPING

(71) Applicant: BorgWarner Inc., Auburn Hills, MI (US)

(72) Inventor: Daniel L. Deland, Davison, MI (US)

(73) Assignee: BorgWarner Inc., Auburn Hills, MI (US)

( * ) Notice: Subject to any disclaimer, the term of this patent is extended or adjusted under 35 U.S.C. 154(b) by 14 days.

(21) Appl. No.: 15/324,003

(22) PCT Filed: Jul. 10, 2014

(86) PCT No.: PCT/US2014/046087
§ 371 (c)(1),
(2) Date: Jan. 5, 2017

(87) PCT Pub. No.: WO2016/007159
PCT Pub. Date: Jan. 14, 2016

(65) Prior Publication Data
US 2017/0175918 A1    Jun. 22, 2017

(51) Int. Cl.
*F16K 31/06* (2006.01)
*F16K 27/02* (2006.01)
(Continued)

(52) U.S. Cl.
CPC ........ *F16K 31/0675* (2013.01); *F16K 27/029* (2013.01); *H01F 7/081* (2013.01);
(Continued)

(58) Field of Classification Search
CPC ... F16K 31/0675; F16K 27/029; H02K 33/02; Y10T 137/8671; H01F 7/081; H01F 7/1607; H01F 2007/085
(Continued)

(56) References Cited

U.S. PATENT DOCUMENTS 6,042,082 A * 3/2000 Graner ............... F02M 51/0614
239/585.1
6,268,784 B1 * 7/2001 Feigel ..................... B60T 8/363
251/129.15
(Continued)

FOREIGN PATENT DOCUMENTS

CN       1253056 A      5/2000
EP       1055812 A2    11/2000
(Continued)

OTHER PUBLICATIONS

International Search Report for Application No. PCT/US2014/046087 dated Apr. 1, 2015, 4 pages.
(Continued)

*Primary Examiner* — John Bastianelli
(74) *Attorney, Agent, or Firm* — Howard & Howard Attorneys PLLC

(57) ABSTRACT

A solenoid actuator is provided that includes a casing. A coil is positioned within the casing. A flux tube and axially separated pole piece are encircled by the coil. An armature is slidably mounted within bores of the flux tube and pole piece. The flux tube and pole piece are separated by a flux choke. A core shunt juxtaposes the pole piece from the flux choke. The core shunt, on major cross-sectional tubular thickness and a minor cross-sectional tubular thickness has an outer diameter of a curved shunt to provide enhanced performance stability.

4 Claims, 4 Drawing Sheets

(51) Int. Cl.
*H01F 7/08* (2006.01)
*H01F 7/16* (2006.01)
*H02K 33/02* (2006.01)

(52) U.S. Cl.
CPC .......... *H01F 7/1607* (2013.01); *H02K 33/02* (2013.01); *H01F 2007/085* (2013.01); *Y10T 137/8671* (2015.04)

(58) Field of Classification Search
USPC ............... 251/129.15–129.22; 335/281, 297; 137/625.69
See application file for complete search history.

(56) References Cited

U.S. PATENT DOCUMENTS

| | | | |
|---|---|---|---|
| 6,318,703 B1 * | 11/2001 | Goossens | B60T 8/363 251/129.15 |
| 6,853,276 B2 * | 2/2005 | Smith | H01H 50/163 335/132 |
| 7,036,525 B2 | 5/2006 | Ichinose et al. | |
| 7,102,479 B2 | 9/2006 | Clark et al. | |
| 7,468,647 B2 * | 12/2008 | Ishibashi | F16K 31/0613 251/129.15 |
| 7,688,169 B2 * | 3/2010 | Zhao | H01F 7/1607 310/12.01 |
| 8,154,370 B2 * | 4/2012 | Ishibashi | H01F 7/081 251/129.15 |
| 8,839,819 B2 | 9/2014 | Holmes et al. | |
| 9,318,246 B2 | 4/2016 | Irie et al. | |
| 2002/0060620 A1 | 5/2002 | Bircann et al. | |
| 2006/0043326 A1 * | 3/2006 | Linkner, Jr. | B60T 8/363 251/129.15 |
| 2009/0121817 A1 | 5/2009 | Ishibashi | |
| 2011/0115587 A1 | 5/2011 | Ishibashi | |
| 2011/0147629 A1 * | 6/2011 | Gruen | H01F 7/13 251/129.15 |
| 2011/0168932 A1 | 7/2011 | Strauss et al. | |
| 2012/0018656 A1 * | 1/2012 | Holmes | F16K 11/07 251/129.15 |
| 2014/0046087 A1 | 2/2014 | Shibasaki et al. | |

FOREIGN PATENT DOCUMENTS

| | | |
|---|---|---|
| JP | 2005140277 A | 6/2005 |
| WO | WO 2011137287 A1 * | 11/2011 |
| WO | WO 2013/116031 A1 | 8/2013 |
| WO | 2013192003 A1 | 12/2013 |

OTHER PUBLICATIONS

English language abstract for CN 1253056 extracted from espacenet.com database on Sep. 10, 2018, 2 pages.

English language abstract for JP 2005140277 extracted from espacenet.com database on Jul. 23, 2018, 2 pages.

* cited by examiner

CURVED SHUNT FOR SOLENOID CURVE SHAPING

CROSS-REFERENCE TO RELATED APPLICATIONS

This application is the National Stage of International Patent Application No. PCT/US2014/046087, filed on Jul. 10, 2014, the content of which is incorporated herein by reference.

FIELD OF THE INVENTION

The present invention relates to solenoid actuators. More particularly, the field of the present invention is that of solenoid actuator valves, especially submersible solenoid valves utilizable in transmissions of automotive vehicles.

BACKGROUND OF THE INVENTION

Many solenoid valves have a ferromagnetic casing. Inserted within the casing is a coil. The coil encircles a flux tube that is magnetically connected with the casing. Axially separated from the flux tube is a pole piece which is also magnetically connected with the casing. Axially separating the flux tube from the pole pieces is a flux choke. Slidably mounted within an inner bore of the flux tube and pole piece is an armature. The armature typically abuts a push rod connected with a valve member which is often a spool type valve. A spool type valve is typically surrounded with a hydraulic housing. The hydraulic housing can often be connected with a control pressure inlet and outlet or port. The control pressure port is typically connected with a hydraulic component of a transmission. A supply pressure inlet or port will be connected with the housing connecting the solenoid valve with a source of pressurized fluid. The housing is often connected with an exhaust port to provide a fluid pressure sump. The solenoid valve will typically be utilized to control the control pressure by selectively connecting the control port with the supply port or the exhaust port. Typically an electronic controller provides signaling to the solenoid valve to move the solenoid spool valve from a neutral or preferred position to a position that facilitates the desired pressure within the control pressure.

In many solenoid valve applications, the spool valve will be spring biased to a position of being normally high control pressure or normally low control pressure. In the normally high position, the spool valve is spring biased to connect the supply port with control port. In a normally low type solenoid valve, the spool valve is spring biased to connect the control port with the exhaust and the solenoid valve is actuated against the spring bias to connect the control port with the supply port.

When a solenoid valve as described above is actuated, the current in the coil creates a magnetic flux loop that goes into the casing to the flux tube into the armature (because of the flux choke) then back into the core shunt into the pole piece and then back into the casing. This flux loop induces the armature to move in its bore within the flux tube and pole piece. The movement of the armature via a push rod is transferred to the spool valve to selectively change the connection of the control port with the exhaust port and/or the supply port.

Certain attributes of the properties of solenoid valves can induce unstable performance. A first property of solenoid valves that can cause instability is that the force output of the armature that is placed up on the spool valve varies depending upon the axial position of the spool valve even when the coil amperage is held at a constant. Accordingly, the armature can place more force on the spool valve when the armature is at its more extended position than at its initial position or vice versa. Another problem associated with solenoid actuators is that the spring which typically biases the armature to a non-engaged position places different amounts of force on the armature depending upon the axial position of the armature. When the armature is at its fully extended position, the spring is typically at its maximum energy storage and therefore places more energy against the armature than when the armature initially moves from its rest position. The properties of the force output of the armature being dependent upon axial position and the resistance force of the spring being dependent upon the axial position can sometimes instigate unstable behavior in the solenoid valve. If the armature force output due to armature axial position variations, activation of the solenoid valve can often cause the armature to move beyond its desired position to either overexpose the control port to the supply port or to the exhaust port. This causes the solenoid valve to cause the control pressure to either increase or decrease beyond what is desired. A solenoid controller is typically unaware of this overreaction of the solenoid valve until there is a sufficient time delay that a pressure sensor, cognizant of the control pressure, can signal the controller to lower the activation of the armature. The controller is cognizant of the pressure within the control pressure, but is not cognizant of the axial position of the armature. Accordingly, the controller based upon a formula or a data table will provide a compensating signal to the solenoid valve to cause the armature to reverse from its prior position. This reversal will often be inaccurate due to the variables of solenoid actuator force and spring force due to the axial position of the armature. Again, the controller will cause the solenoid valve to overcompensate and the result will be an undesirable fluctuation in the control pressure from the control pressure that is desired. It is desirable to provide a solenoid valve that can compensate for the variations in armature force output and spring biasing force output that vary with armature positions.

SUMMARY OF THE INVENTION

To make manifest the above noted and other manifold desires, a revelation of the present invention is brought forth. In a preferred embodiment, the present invention brings forth a solenoid actuator or solenoid valve that includes a casing. A coil is positioned within the casing. A flux tube is magnetically connected with the casing and is encircled by the coil. A pole piece is axially aligned with and separated from the flux tube and encircled by the coil. The pole piece is magnetically connected with a casing. An armature is slidably mounted within the flux tube and the pole piece. A valve member is moved by the armature. A flux choke separates the flux tube from the pole piece. A core shunt juxtaposes the pole piece from the flux choke. The core shunts tapers from a major tubular cross-sectional thickness to a minor cross-sectional tubular thickness. The core shunt along an outer diameter has a curved shape from the major to the minor tubular cross-sectional thickness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
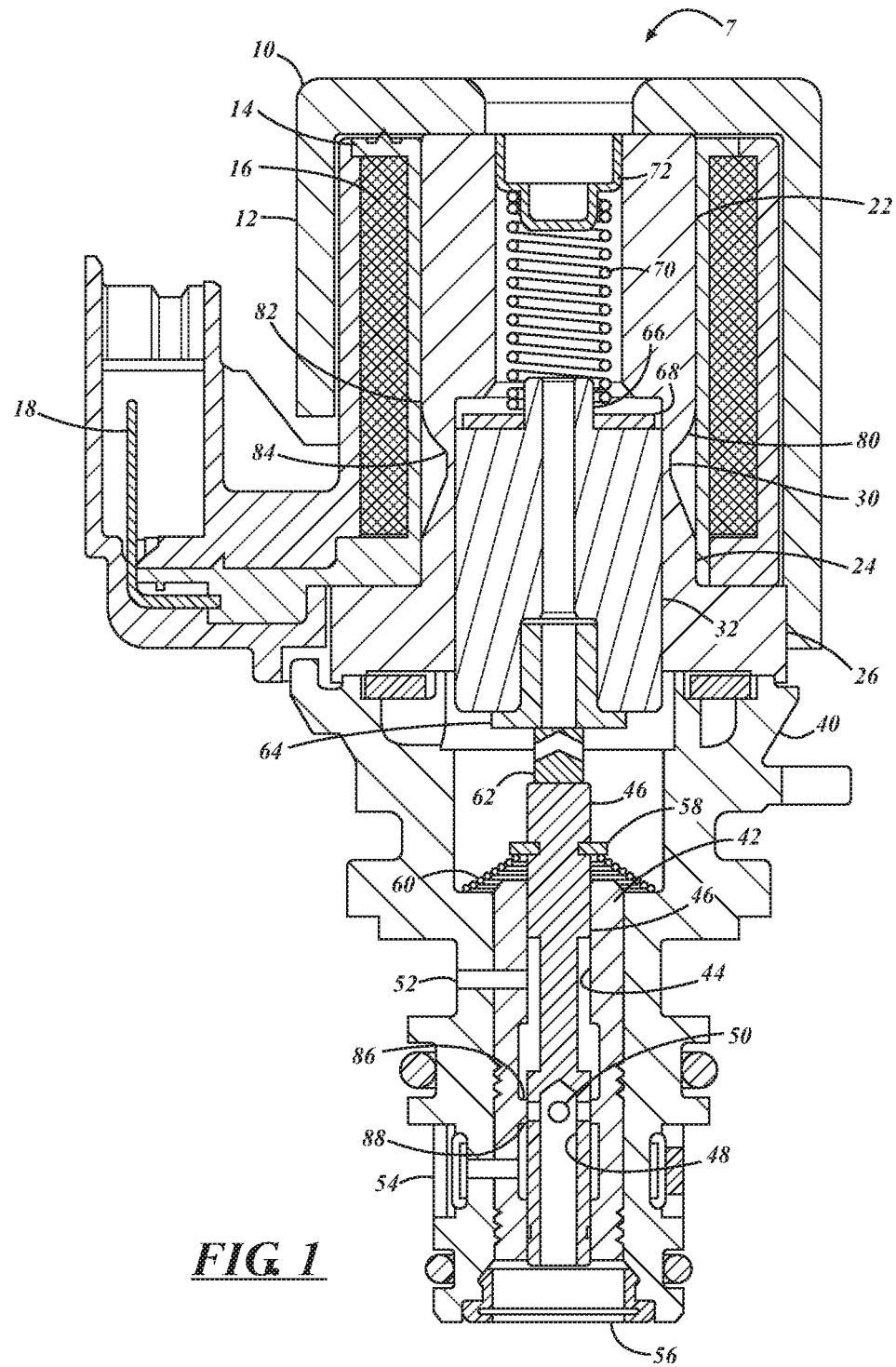
FIG. 1 is a sectional view of a preferred embodiment normally high solenoid valve according to the present invention.

Referring to FIG. 1, a solenoid valve assembly to the present invention is provided. The solenoid valve 7 has a solenoid actuator 10. Solenoid actuator 10 includes a magnetic housing or frame often referred to as a casing or can 12. The can 12 is typically fabricated from a ferromagnetic material, such as steel. Mounted inside the can 12 is a bobbin 14. The bobbin 14 is typically made from a non-magnetic material such as a plastic or other polymeric material. Wrapped around the bobbin 14 is a coil 16 (shown schematically). Most often, the coil is fabricated with copper wire. Electrical terminals 18 are (only one shown) provided to allow for connection with a control source which controls current actuation of the coil 16. Positioned within the bobbin 14 is a pole piece 22. The pole piece 22 along its top end is magnetically connected with the can 12. The pole piece 22 is encircled by the coil 16. As shown, the pole piece 22 via a flux choke 30 is integrally connected to a flux tube 24. The flux tube 24 is axially aligned with the pole piece 22. The flux tube 24 has an integral flux washer 26 which is magnetically connected with the can 12.

The flux choke 30 axially separates the pole piece 22 from the flux tube 24. Slidably mounted within bores of the pole piece 22 and the flux tube 24 is an armature 32. Optionally, the armature 32 or the interior of the pole piece 22 or the interior of the flux tube 24 may be coated with a thin coating of high phosphorous electroless nickel or other non-magnetic material.

Connected with the solenoid actuator 10 is a hydraulic housing 40. The hydraulic housing 40 may be metal or a non-metallic material such as a polymer. Inserted within the hydraulic housing 40 is a liner 42. In most applications, the liner 42 is a metallic material. The liner 42 has an axial bore 44. Slidably mounted within the axial bore 44 is a valve member 46. Valve member 46 on its lower end has an axial bore 48. Axial bore 48 intersects an extreme end of valve member 46 and intersects a series of intersecting cross bores 50. The hydraulic housing 40 has an exhaust port 52 for connection with a pressure sump and a pressure supply port 54 for connection with a pump or other pressure source. An axial end of the hydraulic housing 40 is provided for a control port 56. Encircling the valve member 46 is a retainer 58. Retainer 58 is biased by a low spring rate spring 60 to ensure engagement of the valve member 46 with a push rod 62. The push rod 62 is integrally connected with a centering tee 64 and can be fabricated if desired from a single piece of work stock. The centering tee 64 is inserted within a receiving cavity on an end of the armature 32. The top part of the armature 32 has spring mount extension 66. Fitted around the extension 66 is a non-magnetic air gap spacer 68. Air gap spacer 68 prevents any inadvertent magnetic latching of the armature 32 with the pole piece 22. Extension 66 mounts a biasing spring 70 which biases the armature 32 in a downward position wherein the cross bore 50 is exposed with the supply port 54 when the solenoid 7 is non-actuated. Hence, solenoid 7 is a normally on or normally high type solenoid. A calibration plug 72 is provided to provide preloading compression adjustment upon the biasing spring 70. The pole piece 22 is juxtaposed from the flux choke 30 by a core shunt 80.

The solenoid 7 is typically utilized in applications wherein a command signal is sent to set the pressure in the control volume of a hydraulic part connected with the control port 56. The exhaust pressure is very low or zero and for all intents and purpose can be considered a constant. The supply pressure utilized with the solenoid 7 typically varies over a wide range. The control pressure can vary and the control pressure is usually set by signal sent to solenoid 7. The size of the control volume or the amount of hydraulic fluid in the hydraulic component connected with control port 56 may vary causing variations of fluid delivery from the supply port to the control port (or control port to the exhaust port) to be effectuated by the solenoid valve 7.

For a desired control pressure, solenoid 7 is actuated by a given current delivered to the coils 16. A given current in coil 16 will cause the armature 32 to be pulled upward from the magnetic force caused by the magnetic loop between the can 12, flux tube 24, armature 32, core shunt 80 and the pole piece 22. This actuation of the coil causes the armature 32 to be magnetically pulled upward against the force of the biasing spring 70. The hydraulic pressure in the control port 56 acts upon a cross-section of the valve 46 pushing it upwards into the valve member 46 contacts the push rod 62 to limit its further upward movement.

After the solenoid 7 has been actuated, there is a force balance. The force of the activation of the coil 16 causes the armature 32 to provide an upward force. This upward force of the armature 32 is resisted by the biasing spring 70. Pressure in the hydraulic component being controlled by the solenoid 7 acts through control port 56 to push against the cross-section of the valve 46. If pressure within the component to be controlled should rise beyond that which is desired, the fluid pressure acting through the control port 56 will push valve member 46 upwards causing the cross-bore 50 to meter out flow through landing 86 causing fluid within the component to then exit out through the exhaust port 52. The loss of fluid causes a lowering of the pressure within the component to the desired control pressure. If for some reason, expansion of the control volume or otherwise, pressure within the hydraulic component connected with control port is lowered, the pressure acting upon the valve member 46 is lessened and the biasing spring 70 pushes the armature down pushing the push rod 62 into the valve member causing the cross ports 50 to meter inflow from the supply port 54 into such time the pressurized fluid is added to the hydraulic component until the desired pressure is met.

Figure 2:
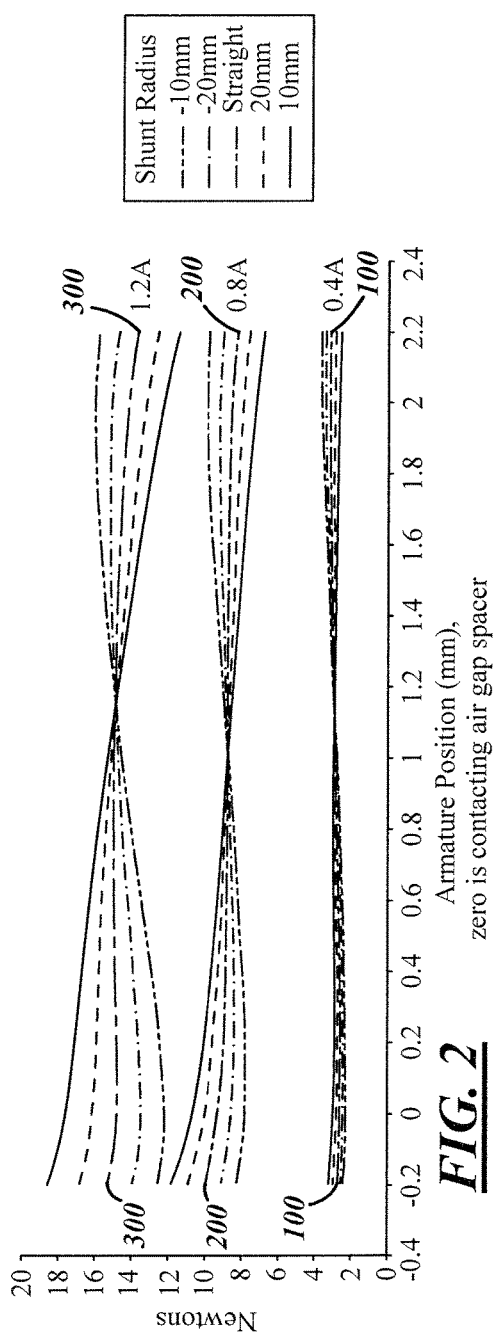
FIG. 2 is a graphic illustration of armature force output versus armature axial position for various fixed amperages for core shunts having different radiuses.

To change the desired pressure in the hydraulic component to be controlled as mentioned previously, the coil 16 is actuated by a controller (not shown). Essentially, increase current will lead to an increased force being placed on the armature to pull the armature upwards. Referring to FIG. 2, line 100 illustrates the force exerted by the armature on a 0.4 amp current. When the armature is at a position furthest away from contacting the flux washer 68 with the core (at approximately 2.2 millimeters), solenoid valves prior to those of the current invention exerted a force 3.3 Newton. At the same axial armature position looking at line 200 when an 0.8 amp current, there is a force of approximately 8.3 Newton at a current of 1.2 amps the armature exerts a force approximately 13.8 Newton. The relationship between current applied to force exerted is essentially a linear proportional relationship. However, there is a variation in the force exerted by the armature for a given current based upon the axial position of the armature. At very low amperages, like 0.4 amps there is only a slight change in the force provided by the armature for a given axial position. However as the current in the coil increases, the variation of the armature force due to axial position tends to increase. At 0.8 amps (line 200) at a position of 2.2 millimeters away from the air gap spacer 68 contacting the core, the force exerted by the armature is approximately 8.3 Newton. However, as the armature moves further upwards the force approaches that of 10 Newton. The affect is more pronounced for a current of 1.2 amps wherein at a position of 2.2 millimeters away the force is approximately 13.8 Newton (line 300) wherein at an upper position wherein the air gap spacer is slightly compressed the force exerted is approximately 15.5 Newton. The non consistency or variation of the force output of the armature based upon the axial position of the armature with relationship to the pole piece 22 can present challenges in the functioning of the solenoid valve The core shunt 80 has a major tubular cross-sectional thickness 82 which tapers down to a minor cross-sectional tubular thickness 84. Prior to the current convention along the outer diameter of the core shunt 80, the path prescribed between the major tubular cross-sectional thickness 82 to the minor cross-sectional tubular thickness 84 was a straight line. The current invention modifies this shunt shape from a straight line to one that is curved. The curving of the core shunt outer diameter may be that of a curvilinear shape such as a conic function or a circular radius. In certain applications it is convex; in other applications it may be concave. In the solenoid valve 7, it has been found that the radius of the curvature be preferably concave at forty millimeters.

Figure 3:
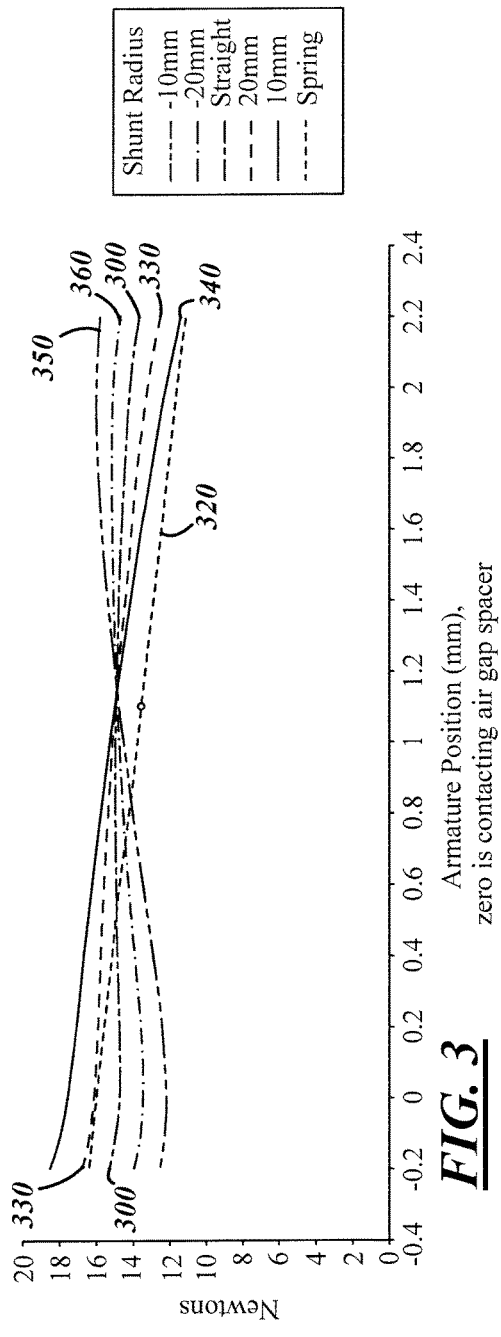
FIG. 3 is an enlargement of the armature force output versus armature axial position for 1.2 amperages.

Referring to FIG. 3, a force output versus armature axial position graph is provided for the solenoid shown in FIG. 1 for the current of 1.2 amps. The graph of FIG. 3 is an enlargement graph shown in FIG. 2 which has been enlarged for clarity of illustration. Line 300 illustrates the relationship between force output of a solenoid valve prior to the present invention wherein the taper of the OD of the flux core shunt is simply a straight line from its maximum diameter to its minimum diameter. When the armature is at its extreme position away from the pole piece the force is approximately 13.8 Newton when the armature is at an extreme position toward the pole piece and the force output is approximately 15.5 Newton. Line 320 illustrates the force exerted on the armature by the biasing spring 70 based on the armature's axial position. Line 320 is essentially linear with its slope dependent upon the spring rate of the spring along with any preload due to the adjustment by the calibration plug. At the armature most extreme position away from the pole piece, the spring places a force of approximately 11.5 Newton against the armature. When the armature is most adjacent to the pole piece, the spring places a force approximately 16.5 Newton upon the armature. Line 340 illustrates the effect of putting a 10 millimeter concave radius upon the flux shunt. At an extreme position away from the pole piece, a 1.2 amperage produces a force of approximately 11.6 Newton and an opposite extreme position places a force upon the armature of approximately 18.5 Newton. Line 330 illustrates the force output versus armature axial position for a shunt with a 20 concave millimeter radius. Line 360 illustrates a force output versus armature axial position for a shunt with a convex curvature of −20 millimeters. Line 350 provides a force output versus armature axial position when the shunt has a convex curvature of −10 millimeter radius.

In setting up a force balance diagram for solenoid 7, the control pressure will act on the diameter of the valve member 46 in an upward direction as shown in FIG. 1. There will be a slight flow force exerted on the valve member from the fluid entering through the supply port 54 and going to the control port 56. There will be also a slight upward force provided by the spring 60. There is an upward force provided by the armature when the coil 16 is actuated. These aforementioned forces for the solenoid valve 7 will be opposed by the force provided by the spring 70. The force provided by the spring 70 on the armature increases as the armature travels to position wherein the air gap spacer 68 makes contact with the pole piece 22. In a normally high solenoid valve as shown in FIG. 1, the magnetic force acts upon the actuator in a direction opposite to the spring 70 to reduce the control pressure as the current of the solenoid valve is increased. The best situation for stability in the operation of the solenoid valve 7 is for the increase in the force output of the armature as it moves axially upward the pole piece 22 be slightly less than the increase force that is placed upon the armature by the spring 70. Accordingly, in many applications, the core shunt 80 will have a concave shape, that is the outer diameter of the shunt will curve inward as compared with a straight line core shunt.

Figure 4:
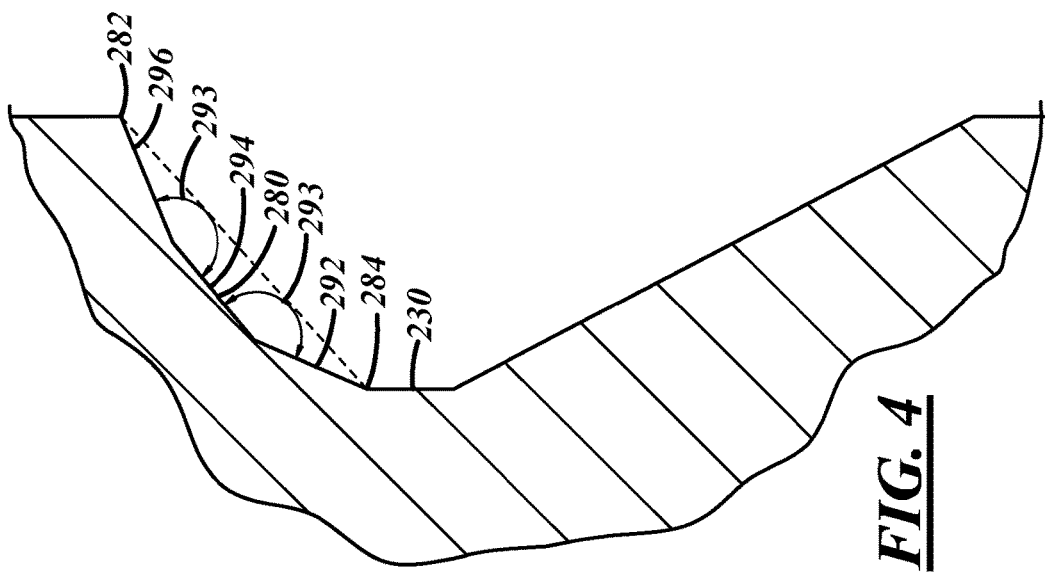
FIG. 4 is an enlargement of a core shunt formed from a plurality of linear segments for a concave core shunt.

Referring to FIG. 4 an enlargement of a multi-linear segment concave core shunt according to the present invention is shown. Core shunt 280 has a major outer diameter 282 and a minor outer diameter 284. The curve shunt 280 is fabricated from linear segments 292, 294 and 296. Linear segment 292 terminates at the flux choke 230. Segments 292 and 294 are obtusely angularly connected together along angle 293.

Figure 5:
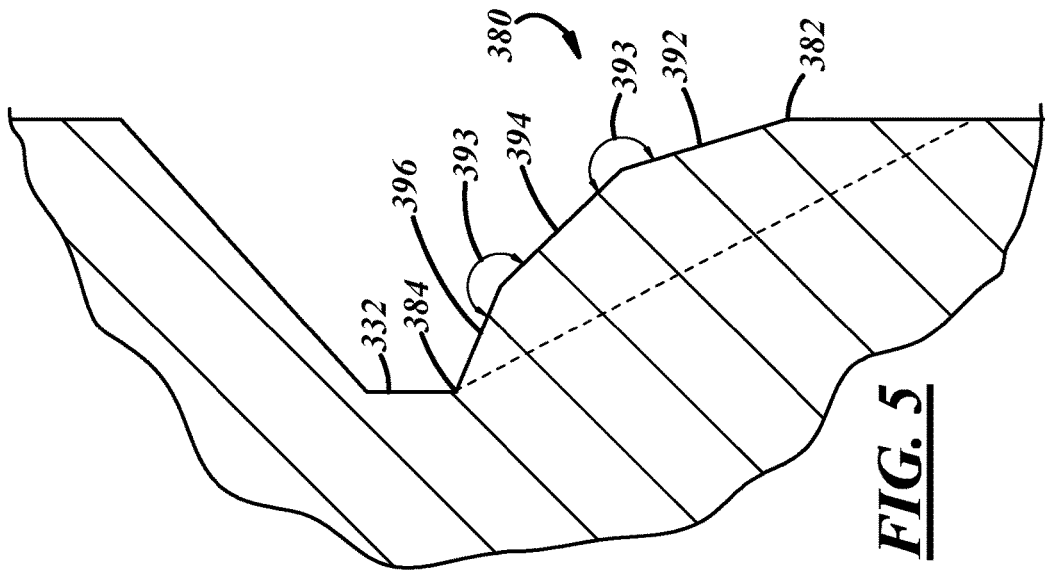
FIG. 5 is an enlargement of a core shunt formed from a plurality of linear segments for a convex core shunt.

FIG. 5 is an enlargement of core shunt 380 and has a convex shape from its major outer diameter 382 to its minor outer diameter 384. There are three linear segments 392, 394, 396. Linear segments 392 and 394 are reflectively angularly connected along angle 393 to provide the convex shape desired for this core flux shunt. The core flux shunt 380 terminates at the core flux choke 332.

Figure 6:
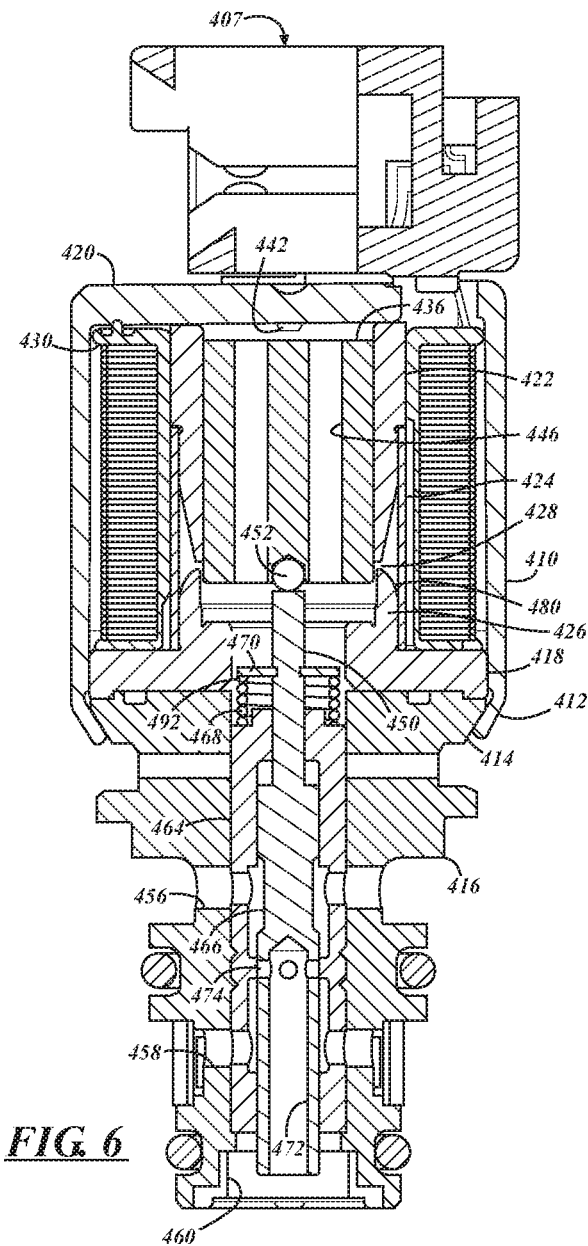
FIG. 6 is a sectional view of a solenoid valve according to the present invention of a normally low type solenoid valve.

Referring to FIG. 6, a normally low immirsible solenoid valve 407 according to the present invention has a ferromagnetic can 410. The can 410 along its lower end has a series of slots (not shown) to aid in their bending over of tabs 412 which contact an inclined portion 414 of a hydraulic body 416 to capture the same to the casing 410 and to a pole washer 418. The can 410 is generally open along its lower end and is closed on its top end 420. The can 410 forms a generally tubular envelope. A flux tube 422 is radially aligned by a non-magnetic alignment tube 424 with a second ferromagnetic annular magnetic member commonly referred to as a pole piece 426. The pole piece 426 is magnetically connected with the can by the pole washer 418. In other embodiments (not shown) the pole piece 426 may be separate from the pole washer 418 even though it is magnetically connected with the can 410 via the pole washer 418. Axially magnetically separating the flux tube 422 from the pole piece 426 is flux choke provided by a gap 428. Radially juxtaposing the flux tube 422 and pole piece 426 from the casing 10 is a coil and bobbin assembly 430.

A ferromagnetic armature 436 is slidably mounted within the flux tube 422 and the pole piece 426. The top end 420 of the can has extending internally downward there from a dimple 442 to aid in the prevention of magnetic latching of the armature 436 with the can 410. The armature 436 or alternatively the flux tube 422 and pole piece 426 may have a thin lining of non-magnetic material to aid in the prevention of side latching. The armature 436 also has a series of axial passages 446 to allow fluid within the solenoid valve 407 to move between axial sides of the armature 436. The armature 436 imparts movement to a valve member 450 via a ball 452 connected with the armature 436.

The hydraulic body 416 has an exhaust inlet/outlet passage provided by a cross bore 456. A cross-bore 458 is connected with the supply pressure. An axial bore 460 is connected with control pressure. As shown, solenoid 407 is a normally low control pressure solenoid valve. Hydraulic body 416 is a polymeric member having a metallic inner liner or sleeve 464. Slidably mounted within the sleeve is the valve member 450 having a spool portion 466. The spool portion 466 is biased by a spring 468. Spring 468 has a top end 492 which engages a retainer or washer 470. The spool 466 has an internal passage 472 which is connected with the control pressure which intersects a series of cross bores 474. Cross bores 474 are typically positioned wherein they fluidly communicate with cross bore 456 bringing control pressure in communication with exhaust. To cause control pressure to be connected with supply pressure, the coil is actuated causing the armature 436 to move against the biasing of spring 468 causing cross bores 474 to be brought in fluid communication with the hydraulic body cross bore 458 which is connected with fluid supply to increase the hydraulic pressure in the system. The activation of the coils 434 generates a flux loop in the can, flux washer, and flux tube. Due to the gap 428, the flux loop will skip into the armature 436 and then exit out through the armature to the pole piece 426 causing the armature 436 to reach a point of least reluctance thereby causing the armature 436 to move downward.

The solenoid valve 407 is acted upon by the fluid pressure in the control port 460 to push the spool 466 upwards in the same direction that it is urged by the spring 468. In most applications, the spring force exerted on the armature 446 is very slight. Accordingly, in most applications, the shunt 480 will be convex. In applications wherein the spring force exerted by spring 468 is relatively great, the shape of the core shunt can be concave.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid actuator valve comprising:
   a casing;
   a coil positioned within said casing;
   a flux tube magnetically connected to said casing and encircled by said coil;
   a pole piece axially aligned with and axially separated from said flux tube and encircled by said coil, said pole piece being magnetically connected with said casing;
   an armature slidably mounted within said flux tube and said pole piece;
   a hydraulic housing connected with said casing, said hydraulic housing having a control pressure connection, a supply pressure connection, and an exhaust connection;
   a valve member moved by said armature to selectively connect a control pressure with a supply pressure or an exhaust pressure;
   a spring biasing said valve member in a preferred position connecting said control pressure with one of said supply pressure and exhaust pressure, and wherein said control pressure axially reacts against said valve member;
   a flux choke disposed between said flux tube and said pole piece, and separating said flux tube from said pole piece; and
   a core shunt juxtaposing said pole piece and said flux choke, said core shunt tapering from a major tubular cross-sectional thickness to a minor tubular cross-sectional thickness, said core shunt along an outer diameter having a curved shape from said major to said minor tubular cross-sectional thicknesses, and said core shunt being configured to complete a magnetic loop between said flux tube, said pole piece, and said armature;
   wherein said solenoid actuator valve is normally low such that said valve member is biased to connect said control pressure with said exhaust pressure; and
   wherein said core shunt has a convex shape.

2. A solenoid actuator valve as described in claim 1 configured as a proportional solenoid actuator valve such that a relationship of a current applied to said coil to a force exerted on said armature is a linear proportional relationship.

3. A solenoid actuator valve as described in claim 1, wherein said core shunt curved shape is formed from a plurality of linear segments.

4. A solenoid actuator valve as described in claim 1, wherein said core shunt curved shape is formed by at least three or more linear segments.

* * * * *